United States Patent
Lai et al.

(10) Patent No.: US 7,751,518 B2
(45) Date of Patent: Jul. 6, 2010

(54) SYSTEM AND METHOD FOR EXECUTING PREAMBLE DETECTION, SYMBOL TIMING RECOVERY, AND FREQUENCY OFFSET ESTIMATION

(75) Inventors: Kuo-Li Lai, Taichung (TW); Ching-Piao Hung, Jhudong Township, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1111 days.

(21) Appl. No.: 11/344,174

(22) Filed: Feb. 1, 2006

(65) Prior Publication Data

US 2007/0071136 A1 Mar. 29, 2007

(30) Foreign Application Priority Data

Sep. 29, 2005 (TW) .............................. 94133927 A (51) Int. Cl.
*H04L 7/00* (2006.01)
(52) U.S. Cl. ..................... 375/355; 375/356; 375/357; 375/320
(58) Field of Classification Search ............... 375/329, 375/355–357
See application file for complete search history.

(56) References Cited

U.S. PATENT DOCUMENTS

| | | | |
|---|---|---|---|
| 6,683,493 B1* | 1/2004 | Fujimora et al. | 329/304 |
| 6,898,198 B1* | 5/2005 | Ryan et al. | 370/338 |
| 6,993,100 B2* | 1/2006 | Yang et al. | 375/342 |
| 2004/0208261 A1* | 10/2004 | Chen | 375/319 |
| 2005/0063493 A1* | 3/2005 | Foster | 375/329 |
| 2005/0208897 A1* | 9/2005 | Lyons et al. | 455/67.11 |
| 2006/0269018 A1* | 11/2006 | Li et al. | 375/343 |

\* cited by examiner

*Primary Examiner*—Chieh M Fan
*Assistant Examiner*—Qutbuddin Ghulamali
(74) *Attorney, Agent, or Firm*—Bacon & Thomas, PLLC (57) ABSTRACT

The present invention describes a method and a system for executing preamble detection, symbol timing recovery, and frequency offset estimation that are applied to a PHS system for executing the preamble symbol detection and timing recovery. The system includes a first absolute value circuit, an average circuit, a multiplier, a sample and accumulate circuit coupled to the multiplier, a second absolute value circuit, a first compare circuit, and a second compare circuit, such that the system with the foregoing structure can detect a preamble symbol by less symbols while performing a timing recovery. The invention also describes a frequency offset computation method and its circuit.

8 Claims, 12 Drawing Sheets

(PRIOR ART)
FIG. 1

| R | SS | PREAMBLE | UW | DATA | CRC |
|---|----|----|----|----|----|
| 4 | 2 | 62 | 32 | 108 | 16 |

(PRIOR ART)
FIG. 2a

| R | SS | PR | UW | DATA | CRC |
|---|----|----|----|------|-----|
| 4 | 2  | 6  | 16 | 180  | 16  |

TABLE 1

| NUMBER OF SYMBOLS | 0 | 1 | 2 | 3 | 4 | 5 | 6 | 7 | 8 | 9 | 10 | 11 |
|---|---|---|---|---|---|---|---|---|---|---|---|---|
| PHASE | $\frac{\pi}{4}$ $+\Delta fT$ | 0 $+\Delta fT$ | $\frac{3\pi}{4}$ $+2\Delta fT$ | $\frac{2\pi}{4}$ $+3\Delta fT$ | $\frac{5\pi}{4}$ $+4\Delta fT$ | $\frac{4\pi}{4}$ $+5\Delta fT$ | $\frac{7\pi}{4}$ $+6\Delta fT$ | $\frac{6\pi}{4}$ $+7\Delta fT$ | $\frac{\pi}{4}$ $+8\Delta fT$ | 0 $+9\Delta fT$ | $\frac{3\pi}{4}$ $+10\Delta fT$ | $\frac{2\pi}{4}$ $+11\Delta fT$ |

CASE 1. PHASE DIFFERENCE BETWEEN TWO SYMBOLS

TABLE 2

| NUMBER OF SYMBOLS | 0 | 1 | 2 | 3 | 4 | 5 | 6 | 7 | 8 | 9 |
|---|---|---|---|---|---|---|---|---|---|---|
| PHASE DIFFERENCE | $\frac{2\pi}{4}$ $+2\Delta fT$ | $\frac{2\pi}{4}$ $+2\Delta fT$ | $\frac{2\pi}{4}$ $+2\Delta fT$ | $\frac{2\pi}{4}$ $+2\Delta fT$ | $\frac{2\pi}{4}$ $+2\Delta fT$ | $\frac{2\pi}{4}$ $+2\Delta fT$ | $\frac{-6\pi}{4}$ $+2\Delta fT$ | $\frac{-6\pi}{4}$ $+2\Delta fT$ | $\frac{2\pi}{4}$ $+2\Delta fT$ | $\frac{2\pi}{4}$ $+2\Delta fT$ |

THEREFORE, ALL MOD (PHASE DIFFERENCE $-\frac{\pi}{4}$, $2\pi$) = $2\Delta fT$

FIG. 10 (TABLE 1, TABLE 2)

CASE 2. PHASE DIFFERENCE AMONG THREE SYMBOLS

| NUMBER OF SYMBOLS | 0 | 1 | 2 | 3 | 4 | 5 | 6 | 7 | 8 | 9 |
|---|---|---|---|---|---|---|---|---|---|---|
| PHASE DIFFERENCE | $\frac{\pi}{4}$ +3$\Delta fT$ | $\frac{5\pi}{4}$ +3$\Delta fT$ | $\frac{\pi}{4}$ +3$\Delta fT$ | $\frac{5\pi}{4}$ +3$\Delta fT$ | $\frac{\pi}{4}$ +3$\Delta fT$ | $\frac{-3\pi}{4}$ +3$\Delta fT$ | $\frac{-7\pi}{4}$ +3$\Delta fT$ | $\frac{-3\pi}{4}$ +3$\Delta fT$ | $\frac{\pi}{4}$ +3$\Delta fT$ | $\frac{5\pi}{4}$ +3$\Delta fT$ |

STEP 1. MOD (ALL PHASE DIFFERENCES- $\frac{\pi}{4}$, 2$\pi$)=3$\Delta fT$, $\pi$ +3$\Delta fT$, 3$\Delta fT$, $\pi$ +3$\Delta fT$, ....

STEP 2. MOD (ODD SYMBOL- $\pi$, 2$\pi$)=3$\Delta fT$

TABLE 3

CASE 3. PHASE DIFFERENCE AMONG FOUR SYMBOLS

| NUMBER OF SYMBOLS | 0 | 1 | 2 | 3 | 4 | 5 | 6 | 7 | 8 | 9 |
|---|---|---|---|---|---|---|---|---|---|---|
| PHASE DIFFERENCE | $\pi$ +4$\Delta fT$ | $\pi$ +4$\Delta fT$ | $\pi$ +4$\Delta fT$ | $\pi$ +4$\Delta fT$ | $-\pi$ +4$\Delta fT$ | $-\pi$ +4$\Delta fT$ | $-\pi$ +4$\Delta fT$ | $-\pi$ +4$\Delta fT$ | $\pi$ +4$\Delta fT$ | $\pi$ +4$\Delta fT$ |

THEREFORE, ALL MOD (PHASE DIFFERENCE - $\pi$, 2$\pi$)=4$\Delta fT$

TABLE 4

FIG. 11 (TABLE 3, TABLE 4)

SYSTEM AND METHOD FOR EXECUTING PREAMBLE DETECTION, SYMBOL TIMING RECOVERY, AND FREQUENCY OFFSET ESTIMATION

BACKGROUND OF THE INVENTION

1. Field of the Invention

The present invention relates to a system and a method for executing preamble detection, symbol timing recovery, and frequency offset estimation, and more particularly to a system and a method that use less symbols to detect preamble symbol with the calculation of performing timing recovery and frequency offset calculation.

2. Description of the Related Art

In a Japanese personal handyphone system (PHS), the preamble of a burst has a known format of 0110, and the preamble is provided for the synchronization of a receiving system, wherein the synchronization includes a preamble detection, a symbol timing detection, and a frequency offset computation. However, the length of the preamble is fixed, and thus the number of symbols remained for executing the symbol timing detection and frequency offset computation is very limited, after the preamble is detected. A probability of error for executing the timing detection and the frequency offset computation with a limited number of symbols becomes larger, and thus it is not easy to obtain accurate timing detections and frequency offsets.

In U.S. Pat. No. 5,574,399 entitled "COHERENT PSK DETECTOR NOT REQUIRING CARRIER RECOVERY" (filed on Oct. 30, 1995 and issued at Nov. 12, 1996), a synchronous PSK detector that does not require a carrier recovery is disclosed, but such PSK detector has the following shortcomings: 1. Only phase data is used for performing the timing recovery; 2. The minimum frequency offset is not necessary a correct frequency offset in a low SNR environment, and thus its moving average value will be misled greatly.

In U.S. Pat. No. 6,038,267 entitled "DIGITAL MODULATOR, MAXIMUM-VALUE SELECTOR, AND DIVERSITY RECEIVER" (filed on Jan. 24, 1997 and issued on Mar. 14, 2000), a digital modulator maximum-value selector, and diversity receiver is disclosed, but such digital modulator has the following shortcomings: 1. A large number of symbols are needed for lowering the computational error; 2. Many buffers are needed for storing the large number of symbols.

In view of the description above, a system and a method for executing preamble detection, symbol timing recovery, and frequency offset estimation are needed for detecting the preamble symbols with less symbols while performing the timing recovery and frequency offset calculation, so as to overcome the foregoing shortcomings of the prior art.

SUMMARY OF THE INVENTION

The primary objective of the present invention is to provide a system for executing preamble detection, symbol timing recovery, and frequency offset estimation that can use less symbols to detect the preamble symbol while performing a timing recovery.

Another objective of the present invention is to provide a method for executing preamble detection, symbol timing recovery, and frequency offset estimation that can use less symbols to detect the preamble symbol while performing a timing recovery.

A further objective of the present invention is to provide a frequency offset computation that can use less symbols to compute its frequency offset while reducing its noise power.

To achieve the foregoing objectives, the system for detecting preamble symbols, and timing recovery applied to a PHS system executes the detection of preamble symbols and the recovery of the timing and comprises a first absolute value circuit, coupled to a differential signal input end for obtaining an absolute value of amplitude for the differential signal, an average circuit coupled to the first absolute value circuit for obtaining a moving average amplitude for all absolute values of amplitude inputted to the differential signal input end, a multiplier having an end coupled to the differential signal input end and another end coupled to a phase control signal, a sample and accumulate circuit coupled to the multiplier for generating a plurality of sampling values after executing the sampling and accumulation of the differential signals, a second absolute value circuit coupled to the sample and accumulate circuit for respectively obtaining the absolute values of the plurality of sampling values, a first compare circuit coupled to the second absolute value circuit for finding the maximum absolute value from the plurality of absolute values, and a second compare circuit coupled separately to the average circuit and the first compare circuit for executing the comparison of the moving average amplitude and the maximum absolute value, and if the maximum absolute value is larger than the moving average amplitude, then a preamble detection signal will be outputted.

To achieve the foregoing objectives, a method for detecting preamble symbols and timing recovery in accordance with the present invention comprises the steps of: using a N-times sampling frequency to sample a plurality of symbol samples, obtaining the amplitude for each sampling point, and then using M sampling points for computing the moving average amplitudes to obtain a moving average amplitude $\tilde{x}$, performing a Z-symbol vector average for N sampling points after each sampling point is processed by a phase signal, obtaining the amplitude from the vector average of the N sampling points, and finding the maximum $\tilde{y}$ of the N sample point amplitudes, and if $\tilde{y} > \tilde{x}$, then a preamble symbol has been found, and the sampling point is the optimal symbol timing point, wherein N-time sampling frequency is 5 times, and M is equal to 64 sampling points, and Z is either 16 or 3 symbols.

To achieve the foregoing objectives, a frequency offset computation circuit in accordance with the present invention comprises an N-symbol delay circuit coupled to a phase signal for delaying the output of the phase signal for N symbols, a first subtractor having an end coupled to the phase signal and another end coupled to the N-symbol delay circuit for obtaining a phase difference between the phase signal and the phase signal after delaying N symbols, a second subtractor having an end coupled to the first subtractor and another end coupled to a specific phase value for subtracting the specific phase value from the phase difference outputted from the first subtractor, a phase average circuit coupled to the second subtractor for executing the accumulation of the phase differences outputted from the second subtractor and computing an average value, and a division circuit coupled to the phase average circuit for dividing the average value by N to obtain the frequency offset of the phase signal.

To achieve the foregoing objectives, a frequency offset computation method in accordance with the present invention comprises the steps of: (a) obtaining a phase difference of the plurality of symbols for every N symbols; (b) subtracting the specific phase value from the phase difference value; (c) repeating the aforementioned steps (a) to (b) for n times and accumulating the phase difference; (d) performing an average of the phase differences; and (e) dividing the average value by N to obtain the frequency offset of the symbol.

To make it easier for our examiner to understand the objectives of the invention, its structure, innovative features, and performance, we use a preferred embodiment together with the attached drawings for the detailed description of the invention.

DETAILED DESCRIPTION OF THE PREFERRED EMBODIMENTS

Figure 1:
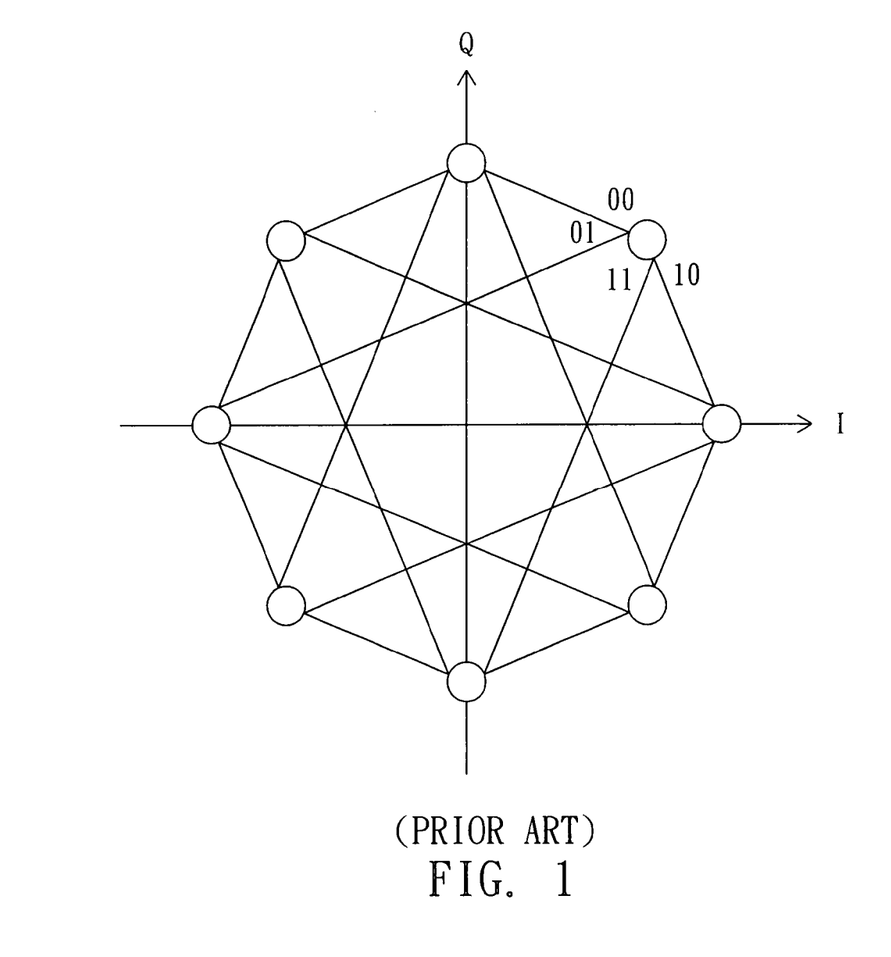
FIG. 1 is a schematic view of a phase change of a transmitted signal of a general PSK system.

Refer to FIG. 1 for the schematic view of a phase change of a transmitted signal of a general PSK system. A system and a method for detecting preamble symbol and timing recovery and a frequency offset computation circuit and its method according to the present invention are applied to a PHS. The modulation method used in the PHS is a π/4 DQPSK modulation; the wireless access method is TDMA-TDD; the sensitivity at the 0.01 bit error is −96.46 dBm; the frequency is 1900 MHz; and the carrier frequency interval is 300 KHz. The π/4 DQPSK modulation method is related to the present invention, but the rest are prior arts which will not be described here.

A phase-shift keying (PSK) is a digital modulation system extensively used in many wireless communications and the π/4 DQPSK modulating is a 90-degree phase difference PSK with a π/4 phase shift, wherein each symbol is coded with two bits and acts as the phase shift in the transmitted carrier signal. The relation between the two bits and the phase shift is described as follows: Bit 00 indicates a π/4 phase shift, bit 01 indicates a 3π/4 phase shift, bit 10 indicates a −π/4 phase shift, and bit 11 indicates −3π/4 phase shift. Therefore, the phase change at a receiving end is shown in FIG. 1 after a symbol is modulated by the foregoing π/4 DQPSK and transmitted. The x-axis I represents phase, and the y-axis Q represents a 90-degree phase-difference. After the receiving end has received several symbols, the phase change diagram is obtained as shown in FIG. 1.

Figure 2A:
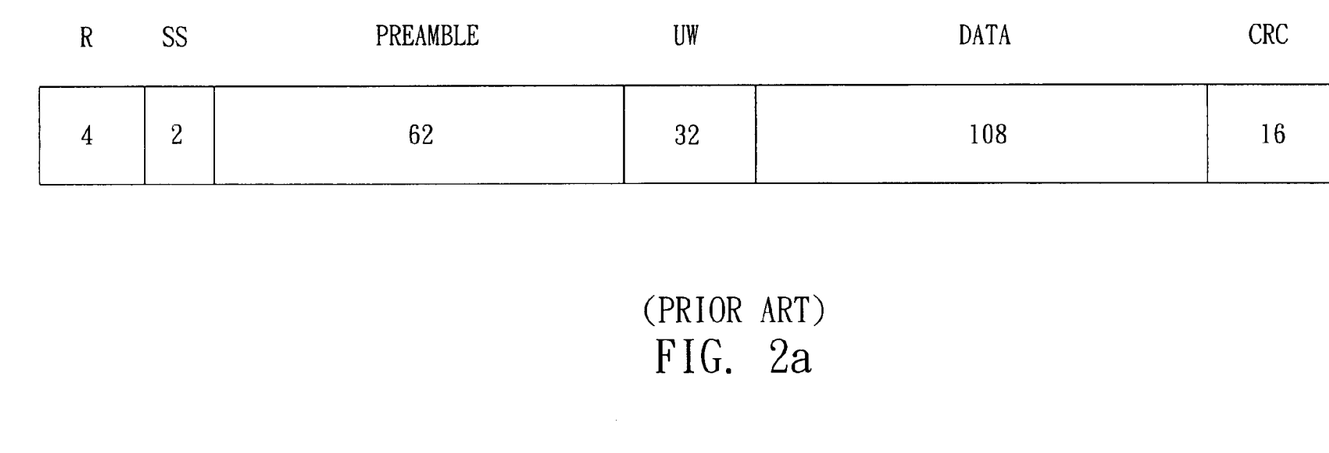
FIG. 2a is a schematic view of a control frame and data frame of a general PSK system.
Figure 2B:
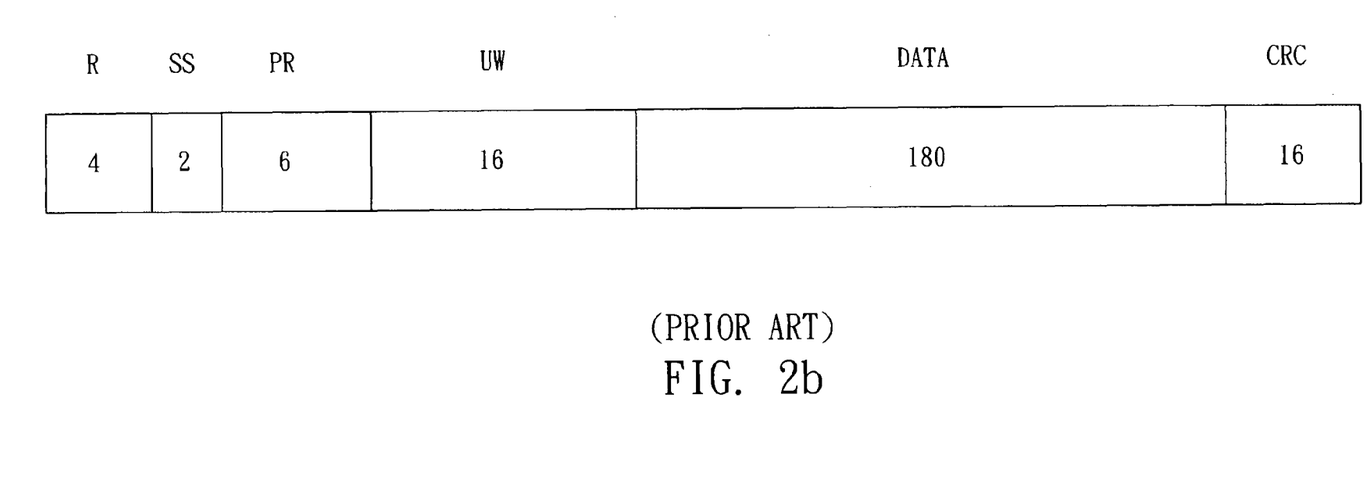
FIG. 2b is another schematic view of a control frame and data frame in a general PSK system.

Refer to FIGS. 2a and 2b for the schematic views of a control frame and data frame of a general PSK system. In FIG. 2a, a control frame (also known as a communication frame) of a general PHS system includes the fields such as a ramp (R), a symbol start (SS), a preamble, an unit word (UW, a specific character), a data, and a cyclic redundancy check (CRC, error detection), wherein the field length of R is 4 bits, and the field length of SS is 2 bits used for notifying the receiving end about the symbol start, and the field length of preamble is 62 bits used by the receiving end to carry out a timing synchronization and it has a special format of 01100110..., and the field length of UW (specific character) is 32 bits used for representing the type of the control frame, and the field length of data is 108 bits used for carrying the data of the control frame, and the field length of CRC (error detection) is 16 bits used for executing the data error detection of the control frame.

In FIG. 2b, a tracking frame (also known as a data frame for transmitting voices) of a general PHS system also includes the fields such as a ramp (R), a symbol start (SS), a preamble, an unit word (UW, a specific character), a data, and a cyclic redundancy check (CRC, error detection), wherein the field length of R is 4 bits, and the field length of SS is 2 bits used for notifying the receiving end about the symbol start, and the field length of preamble is 6 bits used by the receiving end to carry out a timing synchronization and it has a special format of 01100110 . . . , and the field length of UW (specific character) is 16 bits used for representing the type of the control frame, and the field length of data is 180 bits used for carrying the data of the control frame, and the field length of CRC (error detection) is 16 bits used for executing the data error detection of the control frame. The detection of preamble system and timing recovery of the invention are related to the preamble field, and thus other fields will not be described here (please refer to the specifications of the PHS system).

Figure 3:
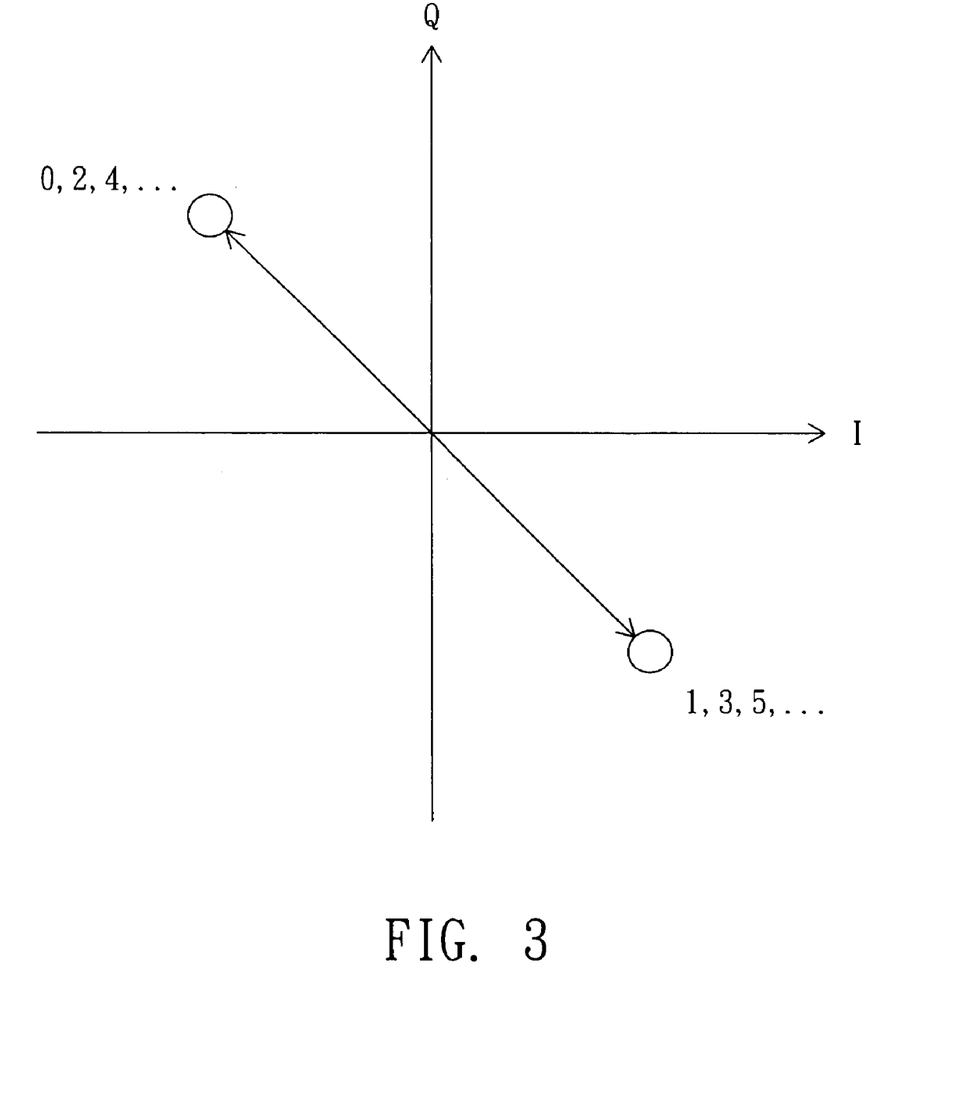
FIG. 3 is a schematic view of a phase change of a transmitted signal of the present invention.

Refer to FIG. 3 for the schematic view of a phase change of a transmitted signal of the present invention. A system and a method for detecting preamble symbol and timing recovery according to the present invention only use the preamble for carrying out the preamble detection and symbol timing recovery. As described above, the preamble comes with a specific format of 01100110..., and the receiving end only receives two bit patterns of 0110, wherein the bit 01 indicates a ¾π phase shift and the bit 10 indicates a −π/4 phase shift. Therefore, the phase change as shown in FIG. 3 only jumps between −π/4 and ¾π.

Figure 4:
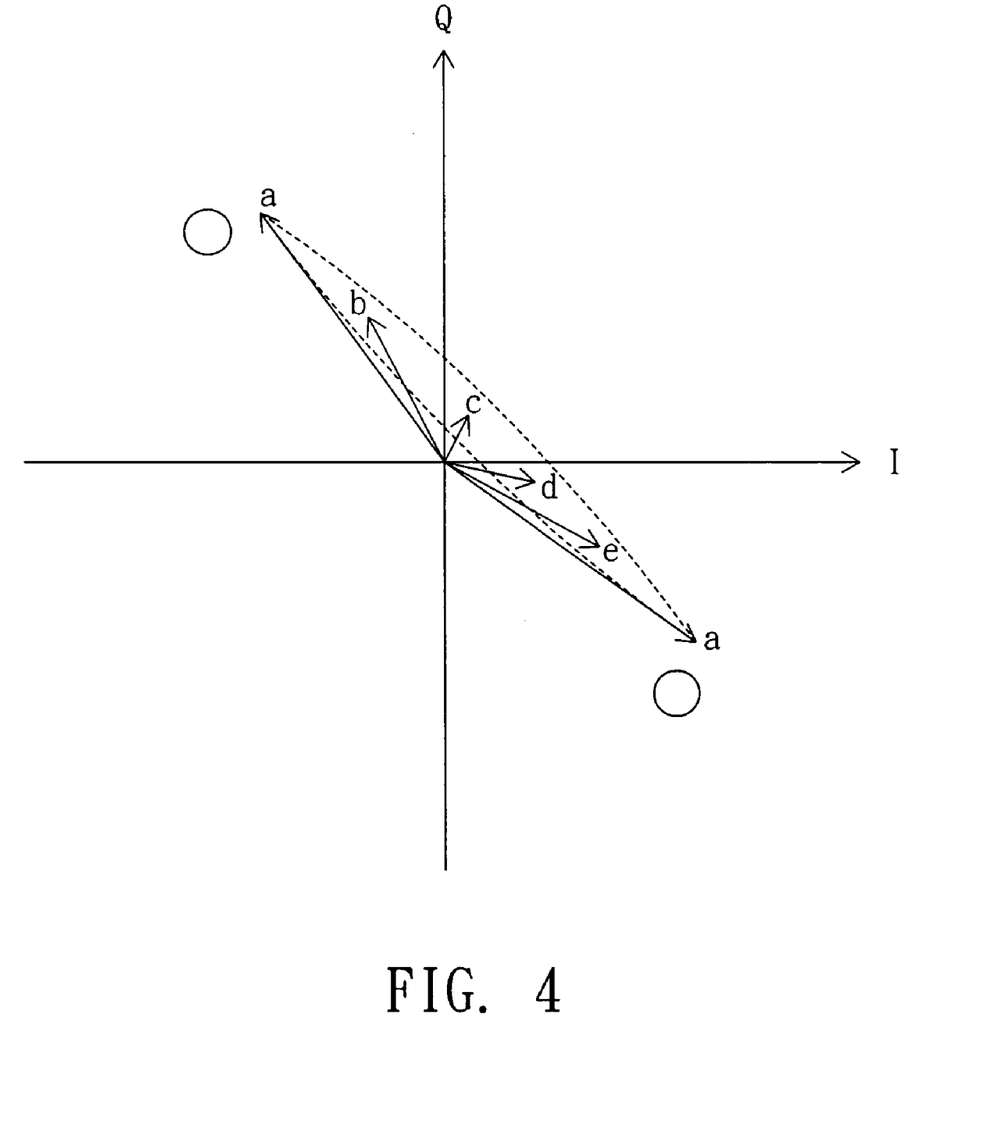
FIG. 4 is a schematic view of a phase change track of executing 5-time sampling for the symbol according to a preferred embodiment of the present invention.

Refer to FIG. 4 for the schematic view of a phase change track of executing 5-time sampling for the symbol according to a preferred embodiment of the present invention. As described above, the prior art synchronous PSK detector only use the phase data to carry out the timing recovery, and thus the minimum frequency offset in a low SNR environment is not necessary a correct frequency offset, and its moving average will be misled greatly. Besides using the phase data for carrying out the preamble detection and the timing recovery, the present invention also uses the amplitude data to overcome the shortcomings of the prior art. In FIG. 4, the method for executing the preamble detection and symbol timing recovery according to the present invention takes a sampling of the phase of the preamble including but not limited to a 5-time sampling and its resolution is 1/10 symbols. Therefore, the locus of each sampling point a, b, c, d, e and its amplitude vector data can be seen during the process of jumping between −π/4 and ¾π. The amplitude vector data of each sampling point a, b, c, d, e can determine which sampling point has the most powerful energy, and such sampling point is the optimal symbol sampling point. The related principle and advantages will be described as followings.

Figure 5:
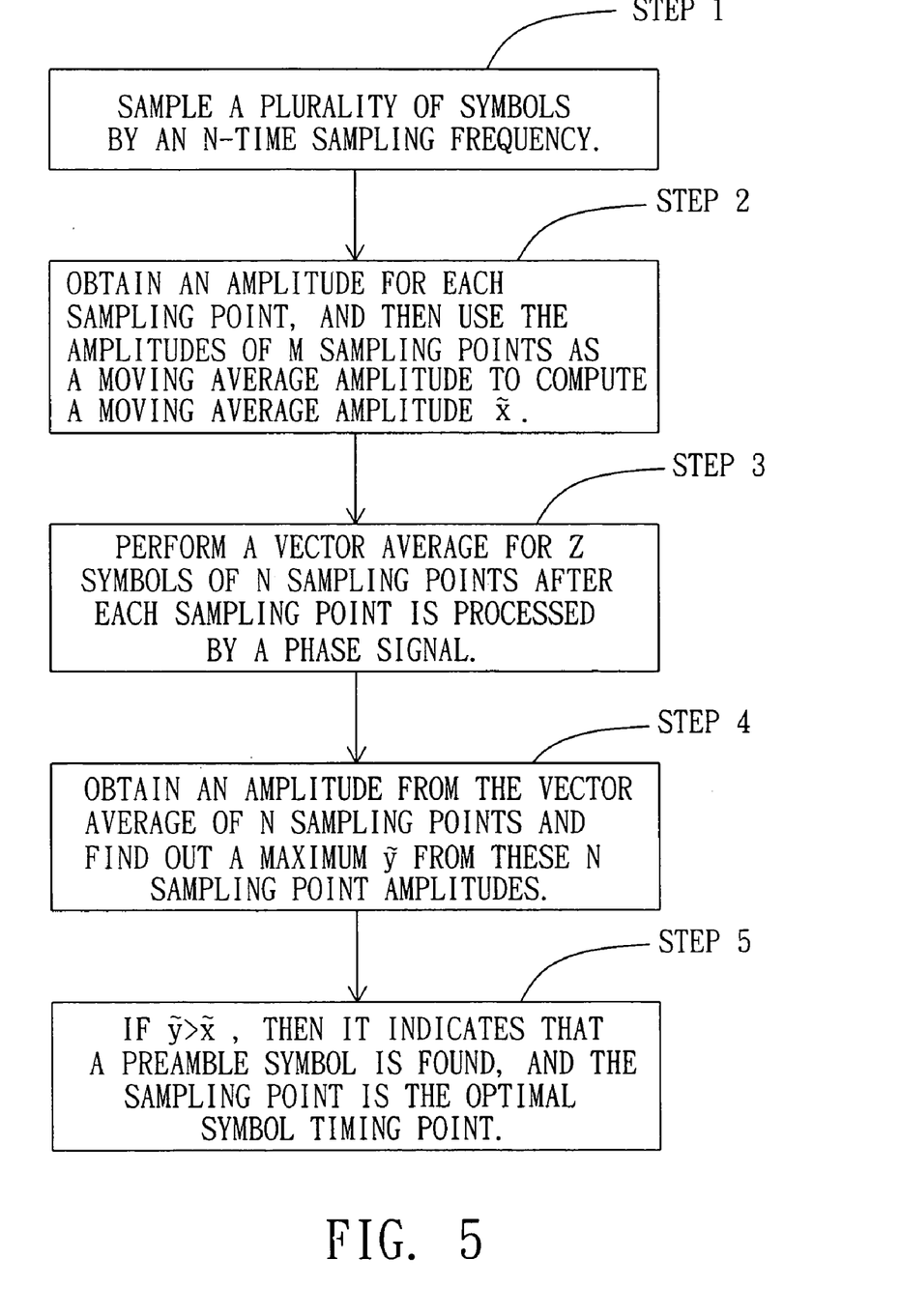
FIG. 5 is a flow chart of a method for detecting preamble symbol and timing recovery according to a preferred embodiment of the present invention.

Referring to FIG. 5 for the flow chart of a method for detecting preamble symbol and timing recovery according to a preferred embodiment of the present invention, the method for detecting preamble symbol and timing recovery comprises the following steps of: (Step 1) using an N-time sampling frequency to sample a plurality of symbols; (Step 2) obtaining an amplitude for each sampling point, and then using the amplitudes of M sampling points as a moving average amplitude to compute a moving average amplitude $\tilde{x}$; (Step 3) computing a vector average for Z symbols of N sampling points, after each sampling point is processed by a phase signal; (Step 4) obtaining an amplitude for the vector average of N sampling points and finding a maximum $\tilde{y}$ from these N sampling points; and (Step 5) if $\tilde{y} > \tilde{x}$, then it indicates that a preamble symbol is found, and the sampling point is the optimal symbol timing point.

In Step 1, this invention uses an N-time sampling frequency to sample a plurality of symbols, where N is 5, and there are five sampling points a, b, c, d, e.

In Step 2, each sampling points a, b, c, d, e obtains its amplitude, and these amplitudes represent the energy level of the sampling points of the symbols. In FIG. 4, the sampling point a has the strongest amplitude, and thus the symbol at the sampling point a has the strongest energy level, and then the amplitudes of the M sampling points include but not limited to 64, which are used as the moving average amplitude to compute a moving average amplitude $\tilde{x}$ of the sampling points a, b, c, d, e.

In Step 3, after each sampling point is processed by a phase signal, the vector average of five sampling points a, b, c, d, e for Z symbols including but not limited to 16 or 3 symbols is calculated to accumulate the amplitude of each sampling point a, b, c, d, e of all symbols and obtain the average amplitude for each sampling point. The difference between Steps 2 and 3 resides on that Step 2 computes the average amplitude $\tilde{x}$ of the sampling points a, b, c, d, e of all symbols and Step 3 computes the average amplitudes $\tilde{a}, \tilde{b}, \tilde{c}, \tilde{d}, \tilde{e}$ of the amplitudes produced by the sampling points a, b, c, d, e of all symbols.

In Step 4, the vector average of five sampling points a, b, c, d, e is used to obtain the amplitudes $\tilde{a}, \tilde{b}, \tilde{c}, \tilde{d}, \tilde{e}$, and a maximum $\tilde{y}$ is found from the these five sampling point amplitudes.

In Step 5, if the sampling point average amplitude $\tilde{y}$ in $\tilde{a}, \tilde{b}, \tilde{c}, \tilde{d},$ and $\tilde{e}$ is larger than the average amplitude $\tilde{x}$ of all sampling points, then it indicates that a preamble symbol is found, and the sampling point is an optimal symbol timing. In FIG. 4, if the sampling point has the strongest amplitude, then its average amplitude $\tilde{a}$ is also the maximum average amplitude in $\tilde{a}, \tilde{b}, \tilde{c}, \tilde{d},$ and $\tilde{e}$. Then, Step 5 just needs to compare the amplitude $\tilde{a}$ and check if it is larger than the average amplitude $\tilde{x}$; if yes, then it indicates that the aforementioned symbol is detected, and the sampling point a is an optimal symbol timing.

The method of this invention references the phase information as well as the amplitude information $\tilde{a}, \tilde{b}, \tilde{c}, \tilde{d}, \tilde{e}$ of the symbols, and thus the invention can overcome the shortcomings of the prior art. For example, if there is only noise but no signal in a low SNR environment and the noise is a Gaussian white noise, then the noise has an even phase distribution, In other words, each phase includes an amplitude distribution. The average amplitude $\tilde{x}$ of the power is relatively weaker. If a signal is inputted, the maximum of its amplitude information $\tilde{a}, \tilde{b}, \tilde{c}, \tilde{d}, \tilde{e}$ will be larger than $\tilde{x}$, since the sampling points a, b, c, d, e of the symbols have the same phase. If the maximum of the amplitude information $\tilde{a}, \tilde{b}, \tilde{c}, \tilde{d}, \tilde{e}$ is larger than $\tilde{x}$, then there will be an inputted symbol. Therefore, the invention can detect the preamble of the symbol quickly.

Figure 6:
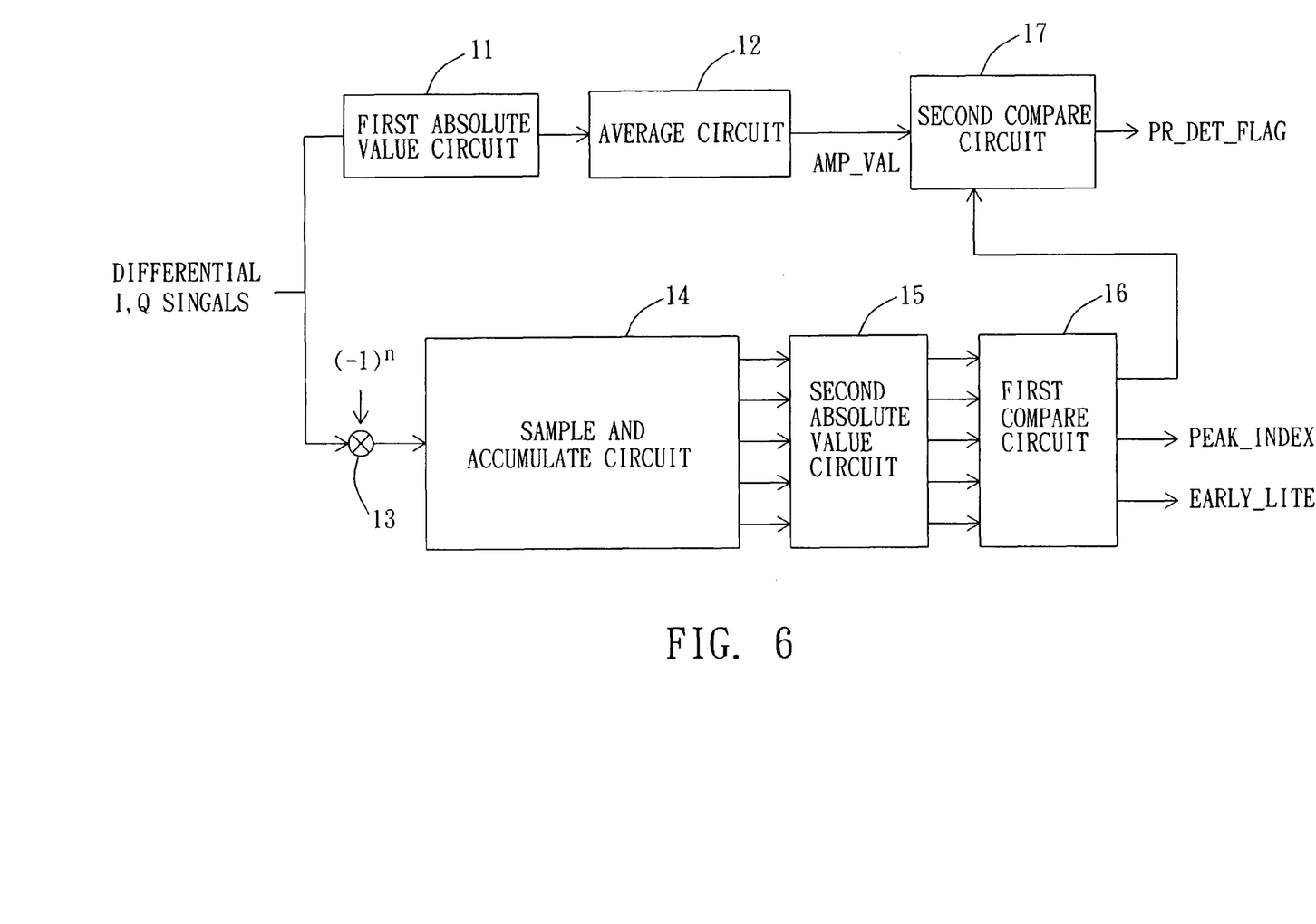
FIG. 6 is a schematic block diagram of a system for detecting preamble symbol and timing recovery according to a preferred embodiment of the present invention.

Referring to FIG. 6 for the schematic block diagram of a system for detecting preamble symbol and timing recovery according to a preferred embodiment of the present invention, the system 1 for detecting preamble symbols and timing recovery can be applied to a PHS system for executing the detection of preamble symbols and the recovery of timing recovery. The system 1 comprises a first absolute value circuit 11, an average circuit 12, a multiplier 13, a sample and accumulate circuit 14, a second absolute value circuit 15, a first compare circuit 16, and a second compare circuit 17.

The first absolute value circuit 11 is coupled to a differential signal input end for finding an absolute value of amplitude for the differential signal, wherein the differential signal input end includes the input of differential I, Q signals.

The average circuit 12 is coupled to the first absolute value circuit 11 for finding a moving average amplitude for all absolute value of amplitudes inputted from the differential signal input end. As illustrated in FIG. 5 and described in Step 2, the average amplitude $\tilde{x}$ for the sampling points a, b, c, d, e of all symbols can be found.

The multiplier 13 has an end coupled to the differential signal input end and another end coupled to a phase control signal $(-1)^n$. The n is the number of incoming symbol, and this phase control signal is 1 and −1 alternately.

The sample and accumulate circuit 14 is coupled to the multiplier 13 for executing the sampling and accumulation of the differential signals, and then producing a plurality of sampling values; wherein the sample and accumulate circuit 14 executes the sampling and accumulation according to the following formula:

$$y_k = \frac{1}{n} \sum_{i=1}^{n} x_{(i-1)*5+k},$$

where i is the serial number of input symbol, and k is the number of sampling point of a symbol, that is k=0, 1, 2, 3, 4.

The second absolute value circuit 15 is coupled to the sample and accumulate circuit 14 for separately obtaining the absolute values of the plurality of sampling values. In FIG. 5, Step 3 obtains the absolute value of the average amplitude $\tilde{a}, \tilde{b}, \tilde{c}, \tilde{d}, \tilde{e}$ on the sampling point a, b, c, d, e of all symbols.

The first compare circuit 16 is coupled to the second absolute value circuit 15 for obtaining the maximum absolute value from the plurality of absolute values $\tilde{a}, \tilde{b}, \tilde{c}, \tilde{d}, \tilde{e}$. In addition, the first compare circuit 16 further outputs an optimal symbol sampling point signal (peak_index) to be used by the frequency offset computation circuit.

The second compare circuit 17 is coupled separately to the average circuit 12 and the first compare circuit 16 for executing the comparison of the moving average amplitude $\tilde{x}$ and the maximum absolute value of $\tilde{a}, \tilde{b}, \tilde{c}, \tilde{d},$ and $\tilde{e}$. If the maximum absolute value of ã, b̃, c̃, d̃, and ẽ is larger than the moving average amplitude x̃, then a preamble detection signal will be outputted.

Therefore, the foregoing structure of the system that can detect preamble symbol and timing recovery only needs to use less symbols to detect the preamble symbol, and thus can definitely overcome the shortcomings of the prior art.

Figure 7:
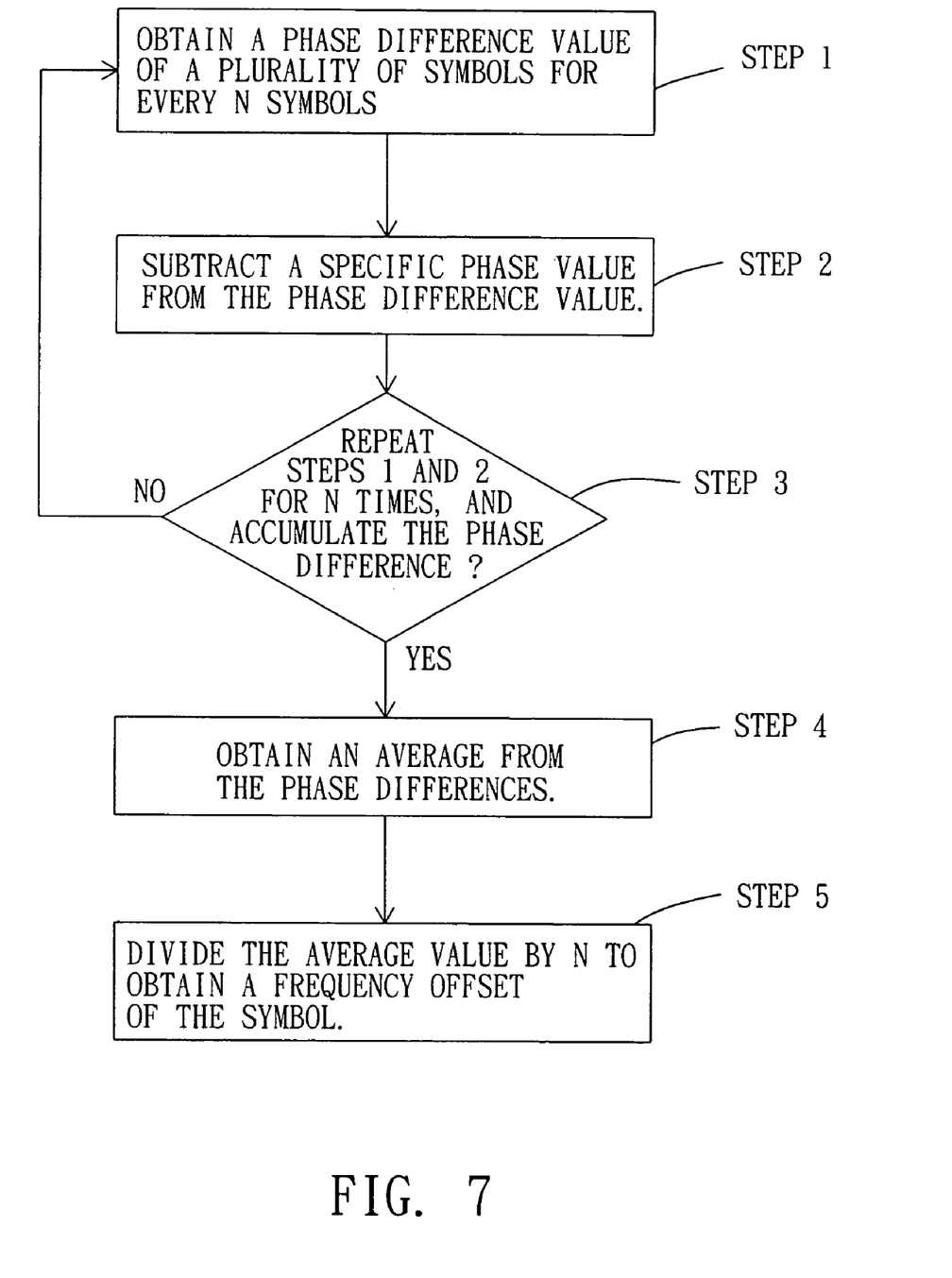
FIG. 7 is a flow chart of a frequency offset computation method according to a preferred embodiment of the present invention.

Referring to FIG. 7 for the flow chart of a frequency offset computation method according to a preferred embodiment of the present invention, the algorithm of the frequency offset computation method of the invention is described as follows:

$$\theta_{(n+4)} - \theta_n = \pi + 4 \times \Delta f \times T_{symbol} + n(\sigma^2) \quad \text{(Formula 1)}$$

Shift π and then divide both sides by 4 to obtain the following:

$$\Delta f \times T_{symbol} + n(\sigma^2/4^2) = \frac{1}{4}((\theta_{n+4} - \theta) - \pi) \quad \text{(Formula 2)}$$

Compared with the 1-symbol differential frequency offset computation method of the prior art, Formula 2 of the invention decreases the noise power $\sigma^2$ to $\frac{1}{16}$.

The frequency offset computation method comprises the steps of:

(Step 1) obtaining a phase difference value from a plurality of symbols for every N symbols; (Step 2) subtracting a specific phase value from the phase difference value; (Step 3) repeating Steps 1 and 2 for n times and accumulating a phase difference; (Step 4) computing the average of the phase differences; and (Step 5) dividing the average by N to obtain the frequency offset of the symbol.

In Step 1, the frequency offset computation method of the invention samples its phase difference value for every four symbols. Therefore, N is equal to 4, which means that the phase difference value of the $5^{th}$ symbol and the $1^{st}$ symbol is obtained, and the amplitude difference value and the phases of the $6^{th}$ symbol and the $2^{nd}$ symbol are obtained, and so on. Therefore, the frequency offset computation method of the invention just needs 12 symbols to obtain the required 8 phases and amplitude difference value.

Figure 8:
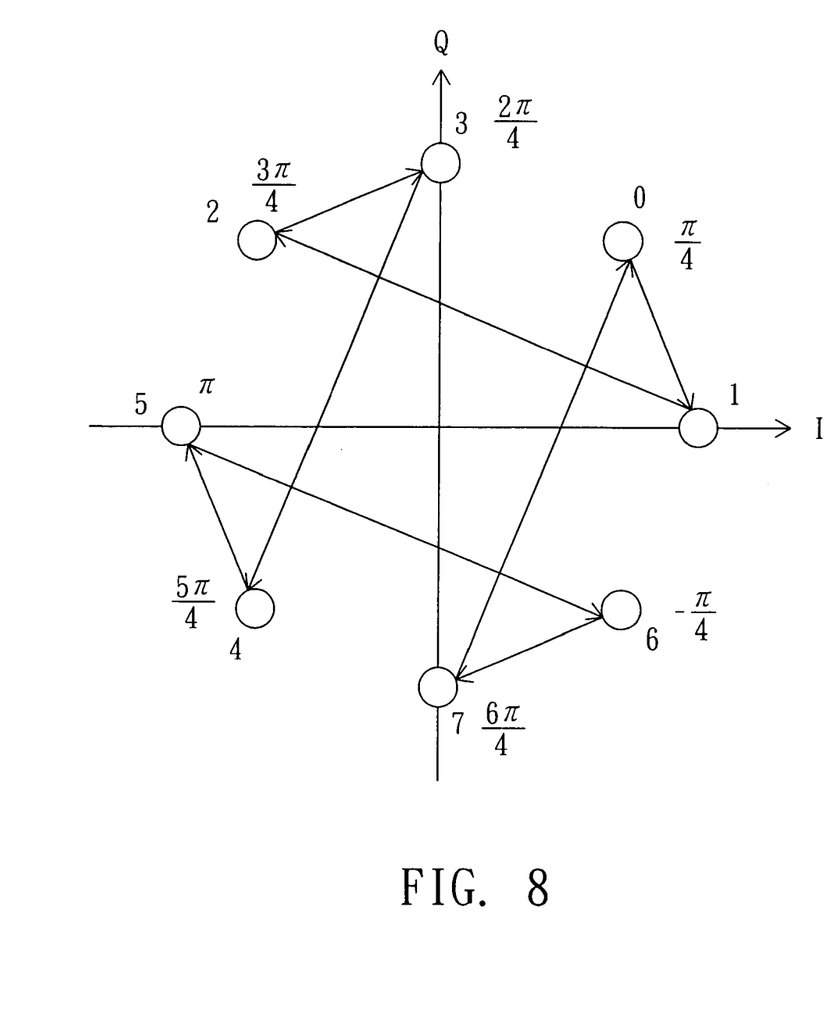
FIG. 8 is a schematic view of a phase change of each symbol of a frequency offset computation method according to a preferred embodiment of the present invention, if the method includes a phase difference Vf and the period of the symbol is T.
Figure 10:
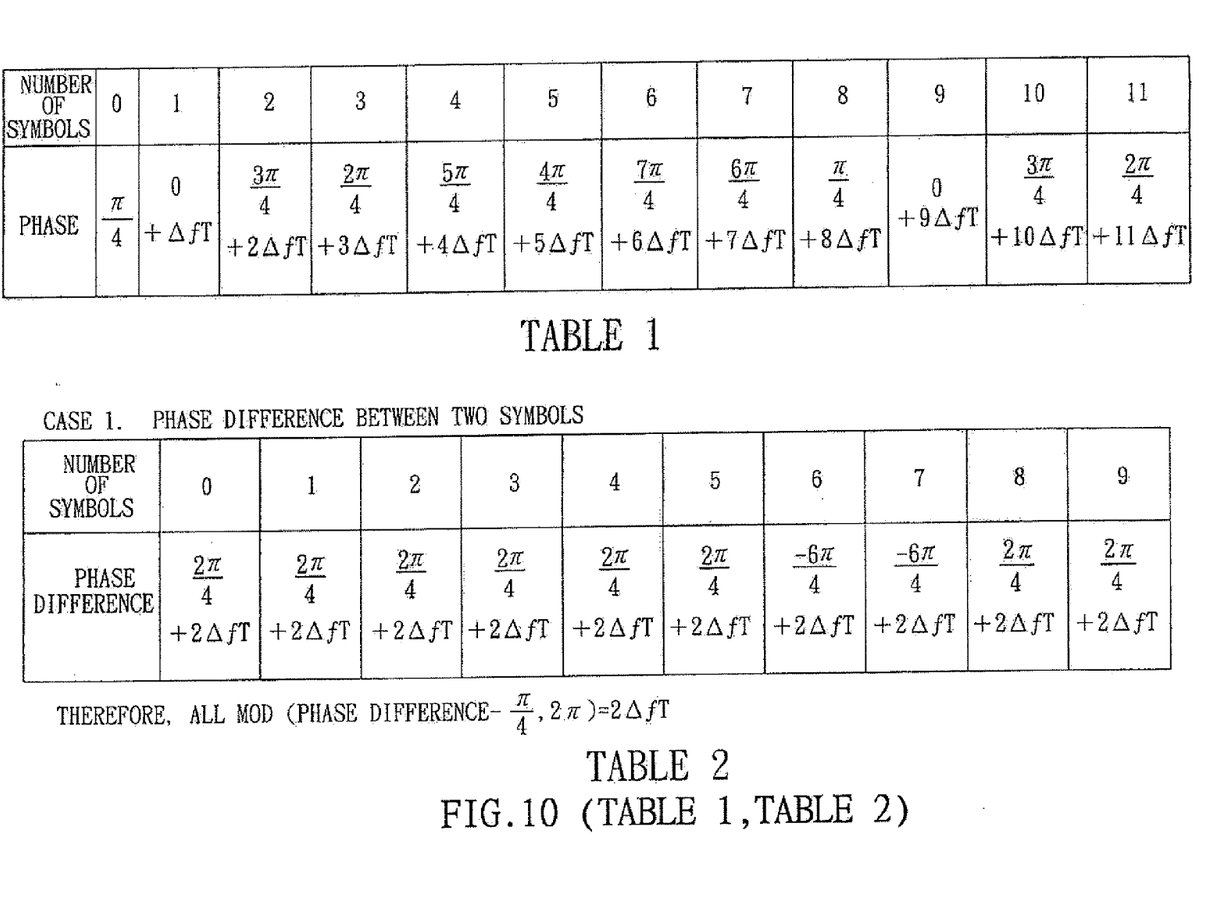
FIG. 10 (TABLE 1 and TABLE 2) respectively show phases of symbols used to detect the preamble symbol while performing a timing recovery, and the phase differences between pairs of the symbols.

In Step 2, it is necessary to subtract specific phase value from the phase difference value. If the frequency difference ∇f is zero and the period of the symbol is T, then the phase change of every symbol is shown in FIG. 8. Referring to Table 1, the phase of the $0^{th}$ symbol is ¼π, the phase of the $1^{st}$ symbol is 0+∇fT, the phase of the $2^{nd}$ symbol is ¾π+2∇fT, the phase of the $3^{rd}$ symbol is ²⁄₄π+3∇fT, and so on. Thus, the phase of the $11^{th}$ symbol is ²⁄₄π+11∇fT. Referring to Table 2, if the phase difference value is the phase difference value between two symbols, the phase of the $0^{th}$ symbol is ²⁄₄π+2∇f T, the phase of the $1^{st}$ symbol is ²⁄₄π+2∇f T, the phase of the $2^{nd}$ symbol is ²⁄₄π+2∇f T, the phase of the $3^{rd}$ symbol is ²⁄₄π+2∇f T, and so on. Therefore, the phase of the $9^{th}$ symbol is ²⁄₄π+2∇fT, and the specific phase value is ²⁄₄π.

Figure 11:
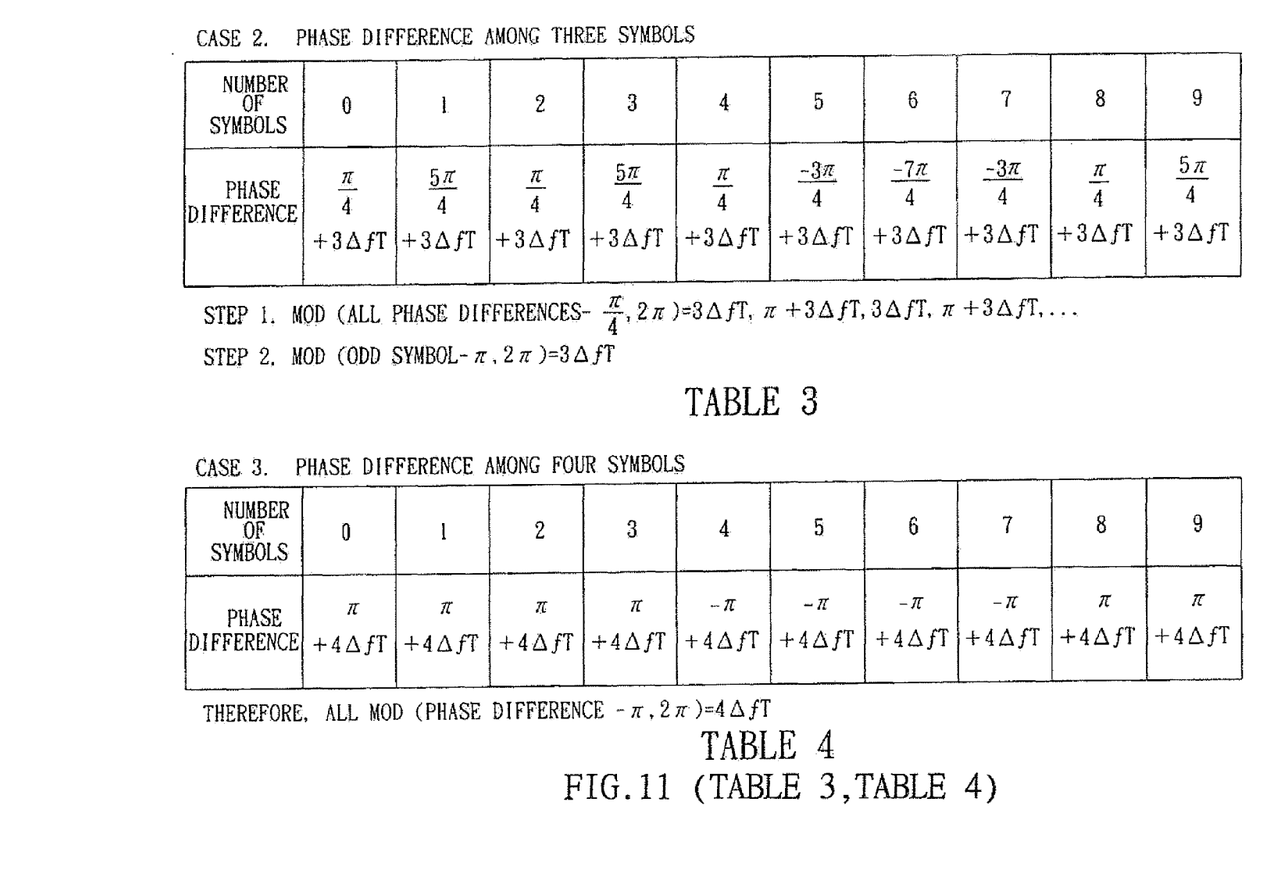
FIG. 11 (TABLE 3, TABLE 4) respectively show phase differences among three and four of the symbols used to detect the preamble symbol.

Referring to Table 3, if the phase difference value is a phase difference value among three symbols, then the phase of the $0^{th}$ symbol is ¼π+3∇f T, the phase of the $1^{st}$ symbol is ⁵⁄₄π+3∇fT, the phase of the $2^{nd}$ symbol is ¼π+3∇fT, the phase of the $3^{rd}$ symbol is ⁵⁄₄π+3∇fT, and so on. The phase of the $9^{th}$ symbol is ⁵⁄₄π+3∇fT, and thus it is necessary to subtract ¼π from all phase difference values and then subtract π from the phase difference value of the odd symbols in this complicated situation.

Referring to Table 4, if the phase difference value is a phase difference value among four symbols, then the phase of the $0^{th}$ symbol is π+4∇fT, the phase of the $1^{st}$ symbol is π+4∇fT, the phase of the $2^{nd}$ symbol is π+4∇fT, the phase of the $3^{rd}$ symbol is π+4∇fT, and so on. The phase of the $9^{th}$ symbol is π+4∇fT. Therefore, the specific phase value is π.

In Step 3, the foregoing Steps 1 and 2 are repeated for n times, and the phase differences are accumulated, where n is equal to 8 times (as described in Step 1).

In Step 4, the average of the phase differences is obtained.

In Step 5, the average is divided by N to obtain the frequency offset of the symbol.

Unlike the prior art, the frequency offset computation method of the present invention uses less symbols (8 symbols) to complete the frequency offset computation, and the noise power $\sigma^2$ is decreased to $1/N^2$ which is $\frac{1}{16}$.

Figure 9:
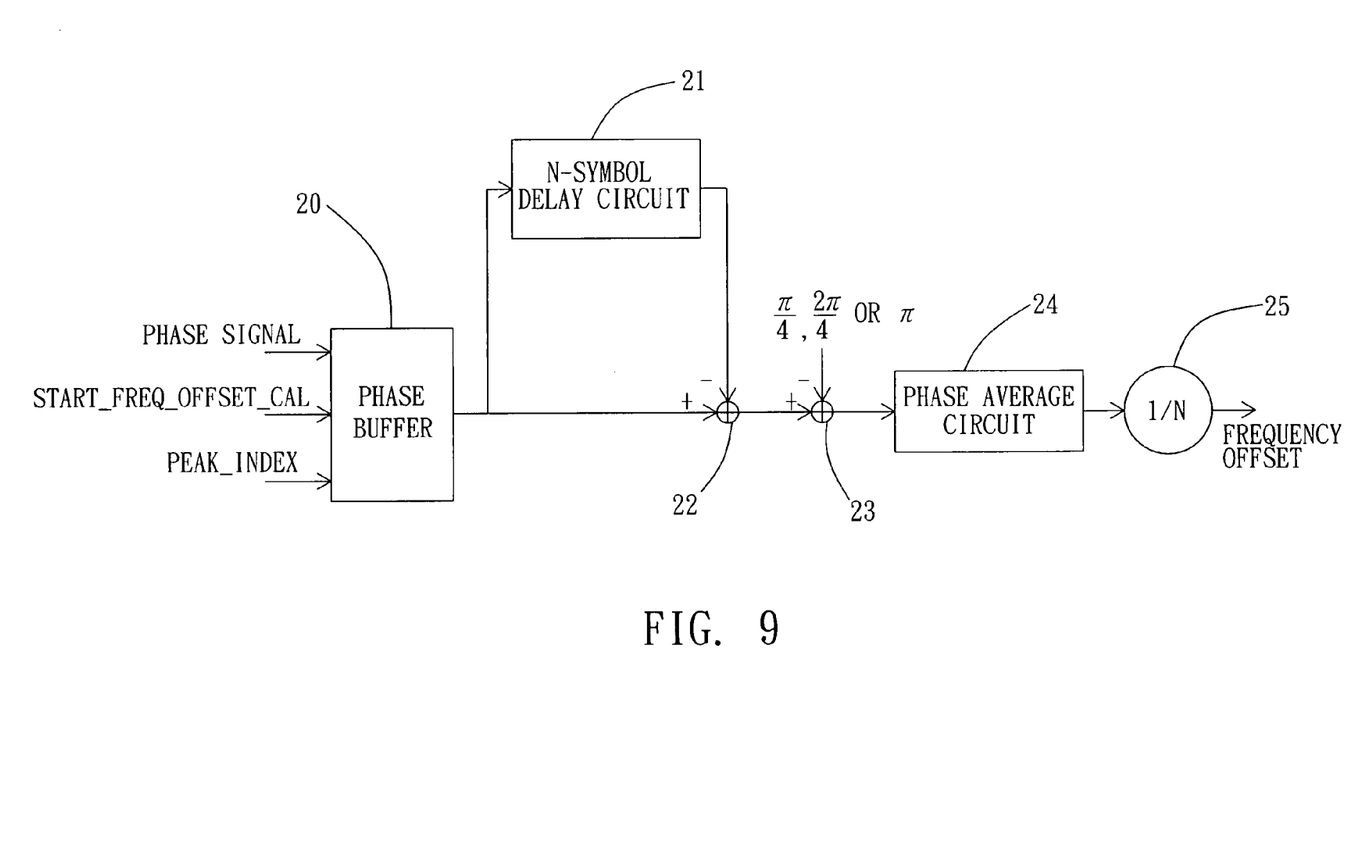
FIG. 9 is a schematic block diagram of a frequency offset computation circuit of the present invention.

Referring to FIG. 9 for the schematic block diagram of a frequency offset computation circuit of the present invention, the frequency offset computation circuit 2 of the invention comprises: an N-symbol delay circuit 21, a first subtractor 22, a second subtractor 23, a phase average circuit 24, and a division circuit 25.

The N-symbol delay circuit 21 is coupled to a phase signal for outputting a phase signal after the phase signal is delayed for N symbols, wherein N is equal to but not limited to 4.

The first subtractor 22 has an end coupled to the phase signal and another end coupled to the N-symbol delay circuit 21 for obtaining a phase difference between phase signals after the phase signal and the delayed N symbol are obtained. For example, if N is equal to 4, then the first subtractor 22 takes the phase difference value of the $5^{th}$ symbol and the $1^{st}$ symbol, the phase difference value of the $6^{th}$ symbol and the $2^{nd}$ symbol, and so on. A total of 8 phase difference values are obtained.

The second subtractor 23 has an end coupled to the first subtractor 22 and another end coupled to a specific phase value for subtracting the specific phase value from the phase difference outputted from the first subtractor 23 due to the frequency constellation. As described above, the specific phase value is ¼π, ²⁄₄π, or π.

The phase average circuit 24 is coupled to the second subtractor 23 for executing the accumulation and obtaining the average of the phase difference values outputted from the second subtractor 23, wherein the number of accumulation is 8 times, and the average is obtained after executing the accumulation for 8 times.

The division circuit 25, which is coupled to the phase average circuit 24, for dividing the average by N to obtain the frequency offset of the phase signal, wherein N is equal to 4.

The frequency offset computation circuit 2 of the invention further comprises a phase buffer 20 coupled to the phase signal and between the N-symbol delay circuit 21 and the first subtractor 22 for storing and maintaining the phase signal, wherein the phase buffer 20 further includes the input of a phase signal and an optimal symbol sampling point signal (peak_index), and the phase buffer 20 starts storing the phase signal when the symbol sampling point signal is not enabled, and starts outputting the phase required for the frequency estimation according to the optimal symbol sampling point. In other words, when the system 1 for detecting preamble symbol and timing recovery has detected a preamble symbol, the optimal symbol sampling point signal starts the frequency offset computation circuit 2 to execute the frequency offset computation.

Therefore, the foregoing structure of the frequency offset computation circuit 2 just needs to use less symbols to compute the frequency offset, and thus it definitely can overcome the shortcomings of the present invention.

With the implementation of the present invention, less symbols are used for detecting the preamble symbol while carrying out the timing recovery and frequency offset computation. The system and method of the invention definitely can overcome the shortcomings of a synchronous PSK detector of a prior art PHS system.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method applied in a personal handy-Phone system (PHS) for detecting preamble symbol and timing recovery, comprising the steps of:

sampling a plurality of symbols of the PHS by an N-time sampling frequency to have N sampling points;

obtaining an amplitude from each sampling point, and using the amplitude of M sampling points as a moving average amplitude to compute a moving average amplitude $\tilde{x}$;

computing a vector average of Z symbols from said N sampling points after said each sampling point is multiplied by a phase control signal which is alternately 1 and −1;

obtaining amplitudes by using said vector average of said N sampling points and computing a maximum $\tilde{y}$ from the amplitudes of said N sampling points; and when the maximum $\tilde{y}$ is larger than the moving average amplitude $\tilde{x}$, preamble symbol is found, and said sampling point is an optimal symbol timing.

2. The method for detecting preamble symbol and timing recovery of claim 1, wherein said N-time sampling frequency is 5 times, M is 64 sampling points and Z is 16 or 3 symbols.

3. The method for detecting preamble symbol and timing recovery of claim 1, wherein said symbol adopts a π/4 Differential Quadrature Phase-Shift Keying (DQPSK) modulation method, and said preamble symbol adopts a specific format with 0110.

4. A system for detecting preamble symbol and timing recovery, being applied in a personal handy-phone system (PHS) for executing a detection of preamble symbol and a recovery of timing, comprising:

a first absolute value circuit, coupled to a differential signal input end, for obtaining an absolute value of amplitude from said differential signal;

an average circuit, coupled to said first absolute value circuit, for obtaining a moving average amplitude for all absolute value of amplitudes inputted from said differential signal input end;

a multiplier, having an end coupled to said differential signal input end and another end coupled to a phase control signal;

a sample and accumulate circuit, coupled to said multiplier for producing a plurality of sampling values after executing a sampling and an accumulation to said differential signal;

a second absolute value circuit, coupled to said sample and accumulate circuit for separately obtaining a plurality of absolute values of said plurality of sampling values;

a first compare circuit, coupled to said second absolute value circuit, for obtaining a maximum absolute value from said plurality of absolute values; and a second compare circuit, separately coupled to said average circuit and said first compare circuit, for executing a comparison of said moving average amplitude and said maximum absolute value, and if said maximum absolute value is larger than said moving average amplitude, then a preamble detection signal will be outputted.

5. The system for detecting preamble symbol and timing recovery of claim 4, wherein said differential signals are differential I signal and differential Q signal.

6. The system for detecting preamble symbol and timing recovery of claim 4, wherein said phase control signal is $(-1)^n$, and n is number of the incoming symbol.

7. The system for detecting preamble symbol and timing recovery of claim 6, wherein said sample and accumulate circuit executes said sampling and accumulation according to the following formula:

$$y_k = \frac{1}{n}\sum_{i=1}^{n} x_{(i-1)*5+k},$$

where i is a serial number of input symbol, and k is the number of sampling point of a symbol, that is k=0, 1, 2, 3, 4.

8. The system for detecting preamble symbol and timing recovery of claim 4, wherein said first compare circuit further outputs an optimal symbol sampling point signal.

* * * * *